Figure 1:
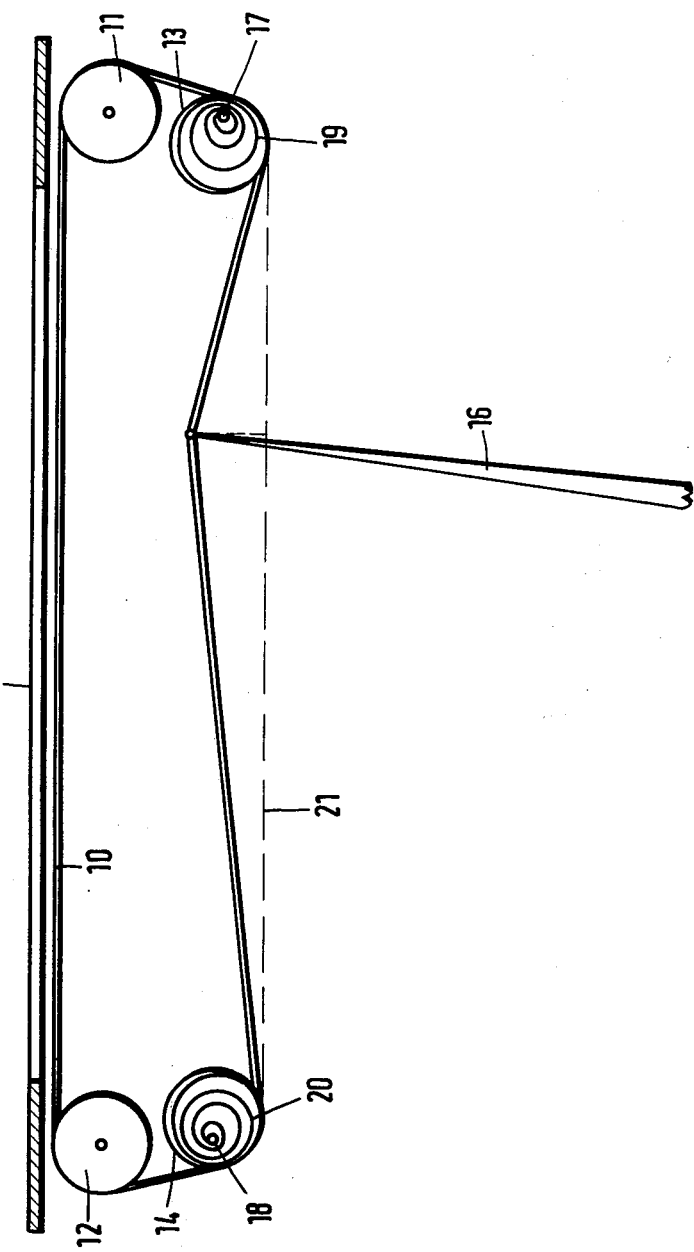

United States Patent [19]
Metz

[11] 4,213,347
[45] Jul. 22, 1980

[54] INDICATING DEVICE FOR MEASURING AND CONTROL APPARATUS

[75] Inventor: Walter Metz, Moosbrunn, Fed. Rep. of Germany

[73] Assignee: Metz Mannheim GmbH, Mannheim, Fed. Rep. of Germany

[21] Appl. No.: 29,744

[22] Filed: Apr. 13, 1979

[30] Foreign Application Priority Data

Apr. 14, 1978 [DE] Fed. Rep. of Germany ....... 2816209

[51] Int. Cl.² .................... G01L 13/02; G01L 19/12
[52] U.S. Cl. .................................. 73/716; 73/432 A; 116/278
[58] Field of Search ................. 73/432 A, 368, 368.7, 73/343 R, 716-729; 116/278

[56] References Cited

U.S. PATENT DOCUMENTS

| | | | |
|---|---|---|---|
| 3,633,200 | 1/1972 | Ellison et al. | 73/432 A |
| 4,051,728 | 10/1977 | Metz | 73/432 A |
| 4,097,799 | 6/1978 | Thorson | 116/278 |

*Primary Examiner*—Donald O. Woodiel
*Attorney, Agent, or Firm*—Herbert L. Lerner

[57] ABSTRACT

In an indicating device for measuring and control apparatus, such as a pressure measuring device, having a planar scale, a flexible, endless indicator tape movable along the scale, at least two rotatable rigidly supported rolls tensionally supporting the tape, a pivotally mounted lever linkage connected at a point thereon to the tape, and means for rotating the lever linkage in an arcuate or circular movement at the connection point thereon in response to the measurement of a given physical parameter, means for compensating a lengthening of the tape caused by the arcuate movement of the lever linkage and tape at the connection point.

11 Claims, 2 Drawing Figures

INDICATING DEVICE FOR MEASURING AND CONTROL APPARATUS

The invention relates to an indicating device for measuring and control apparatus, in which a flexible indicator tape which is movable along a planar scale is guided in stretched condition over at least two rigidly supported first rotating rolls and is tensionally connected to a lever linkage. The rotating movement of the lever linkage takes place proportionally to the movement of a measuring element. The invention also relates to the use of such an indicating device in a pressure measuring device or manometer.

Such indicating devices are known, for instance, from German Petty Patent DE-GM 1 753 796. In this known indicating device the problem of converting the relatively small movement of a measuring element into a relatively large movement of an indicating tape extending parallel to a planar scale without the occurrence of much play in the transmission of these movements within the transmission system, which would falsify the indication of the deflection of the measuring element to be measured, has already been solved. Nevertheless, this known indicating device still has an inaccuracy of the indication. This is because the circular movement of the free end section of the transmission lever connected to one end of the indicator tape is treated like a rectilinear movement. If one wanted to take the deviation between the arcuate and the rectilinear motion into consideration, the devisions of the planar scale would have to be spread out in the middle region as compared to the end regions of the scale, i.e., the linearity of the scale would be destroyed. This, however, would make the preparation of the scales, their calibration and interchangeability more difficult to a considerable degree.

It is accordingly an object of the invention to provide an indicating device for measuring and control apparatus which overcomes the hereinafore-mentioned disadvantages of the heretofore known devices of this general type and in such a manner that deviations from the linearity of the scale are largely avoided or at least are kept so small that they are below the measuring accuracy of the measuring and control apparatus, for which such indicating devices are used.

With the foregoing and other objects in view, there is provided, in accordance with the invention, in an indicating device for measuring and control apparatus, having a planar scale, a flexible, endless indicator tape movable along the scale, at least two rotatable rigidly supported rolls tensionally supporting the tape, a pivotally mounted lever linkage connected at a point thereon to the tape, and means for rotating the lever linkage in an arcuate or circular movement at the connection point thereon in response to measurement of a given physical parameter, means for compensating a lengthening of said tape caused by the arcuate movement of the lever linkage and tape at the connection point.

In accordance with another feature of the invention, the tape is elastic so as to compensate for the arcuate movement of the lever and tape at the connection point.

In accordance with a further feature of the invention, the compensating means are two rotatable resiliently supported rolls supporting the tape, each forming a pair with one of the rigidly supported rolls beyond an end of the scale.

The fact that the stretched indicator tape is an endless belt would not at all initially allow a deflection of the indicator tape which does not lie in the main direction of motion of the tape, i.e., a lengthening of the tape path. Such a deflection of the tape, which just corresponds to the deviation of the circular from the rectlinear motion of the free end section of the lever linkage, is now compensated by the elasticity of the indicator tape and/or the motion of the further rolls made possible by the resilient mounting. Thus, the indicator tape moves uniformly linearly not only in the end regions of the indication but also in the middle region thereof. Minute deviations from this linearity which cannot be read with the naked eye on the scale, are brought about by the fact that the perpendicular projection of the junction point between the indicator tape and the lever linkeage onto the straight connecting line between the two resiliently supported rolls, which would correspond to the shape of the tape in the non-deflected condition, does not coincide with the intersection of the lever linkage with this straight line.

In accordance with an additional feature of the invention, the resiliently supported rolls are mounted on stationary pivot pins, and there are provided spiral springs bracing and resiliently supported rolls against the pivot pins.

In accordance with an added feature of the invention, the resiliently supported rolls are mounted on stationary pivot pins, and there are provided tension spring means, disposed further beyond the end of the scale than the resiliently supported rolls, for keeping the indicator tape taut.

In accordance with yet another feature of the invention, the rigidly supported roll of each pair of rolls faces or points toward the scale and the resiliently supported roll of each pair of rolls faces or points toward the lever linkage.

There are further advantageous embodiments of the invention which relate in particular to an application of the indicating device in a pressure measuring instrument.

In accordance with yet a further feature of the invention, at least part of the lever linkage is formed of rubber-elastic material, preferably the part situated in the immediate vicinity of the connection point.

In accordance with yet an additional feature of the invention, there are provided, a pointed marking disposed on the tape, and it is provided that the scale is engraved in an exchangeable, transparent cover plate.

In accordance with yet an added feature of the invention, there are provided an additional indicator tape disposed parallel to the first-mentioned indicator tape and a metalization coating for activating indicators disposed on one of the tapes from a given zero point to one end of the scale and on the other of the tapes from the zero point to the other end of the scale.

In accordance with still another feature of the invention, there are provided pins supporting the pair of rolls, at least one setpoint lever rotatably connected to the lever linkage, a switch settable to a desired setpoint value disposed on the setpoint lever, a nylon string mounted on the pins and tensionally connected to the setpoint pointer, and a setting knob attached to the string and movable along the scale.

In accordance with a concomitant feature of the invention, when used in a pressure measuring device or manometer, the rotating means is a pressure measuring device comprising two mutually-parallel pressure bellows each having one end face fastened to a fixed pressure plate and another, free end face fastened to a common movable bridge, the lever linkage including an eccentric engaging said bridge so as to arcuately move said connection point and linearly move said indicating tape in accordance with movement of said bellows.

Other features which are considered as characteristic for the invention are set forth in the appended claims.

Although the invention is illustrated and described herein as embodied in an indicating device for measuring and control apparatus, it is nevertheless not intended to be limited to the details shown, since various modifications and structural changes may be made therein without departing from the spirit of the invention and within the scope and range of equivalents of the claims.

Figure 2:
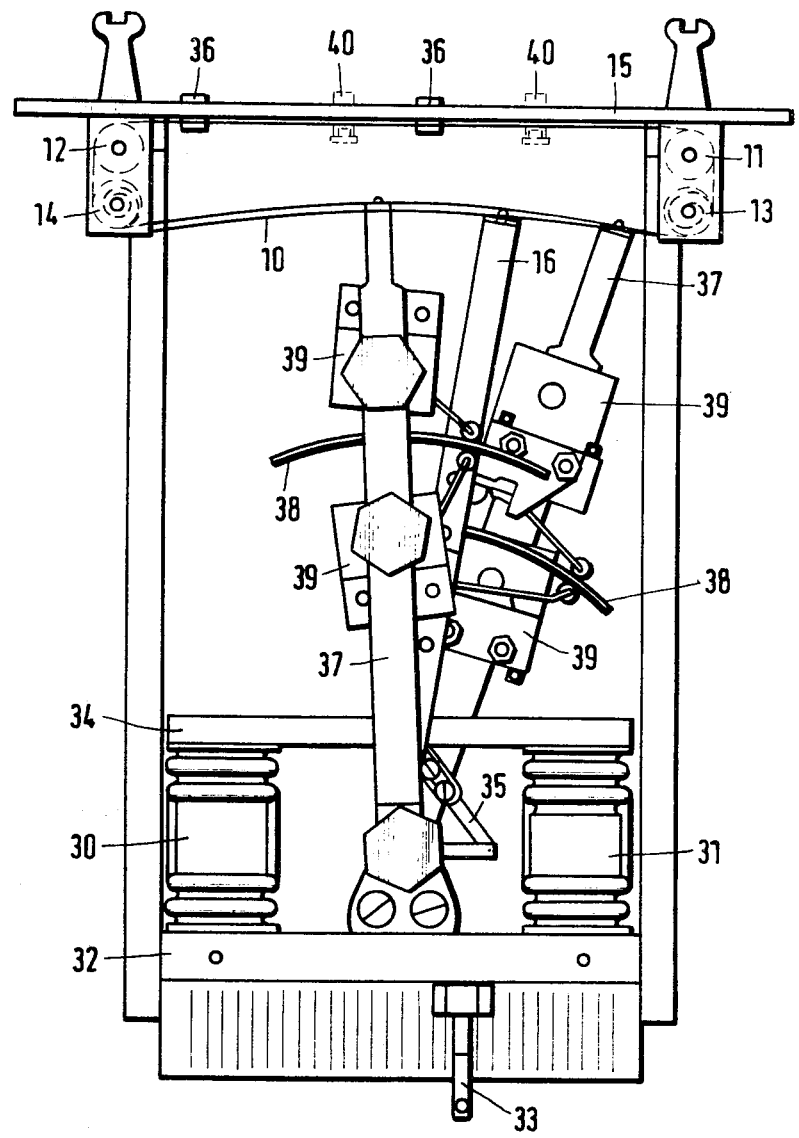

The construction and method of operation of the invention, however, together with additional objects and advantages thereof will be best understood from the following description of specific embodiments when read in connection with the accompanying drawings, in which:

FIG. 1 is a diagrammatic top plan view of the indicating device for a measuring instrument according to the invention; and FIG. 2 is a diagrammatic top plan view onto a pressure measuring instrument with an indicating device according to the invention.

Referring now to the figures of the drawing and first, particularly, to FIG. 1 thereof, it is seen that the indicating device comprises a flexible indicator tape 10 which, however, is inelastic in the lengthwise direction. The tape 10 is constructed in the form of an endless belt and is led over a total of four rotatable rolls 11 to 14. The rolls 11 and 12 are supported rigidly and are disposed above the upper and below the lower end, respectively, of a scale 15 below the cross-sectional area toward the side of FIG. 1. The rolls 13 and 14, each of which form a pair of rolls with one of the respective rolls 11 and 12 are, on the other hand, mounted resiliently. The axes of the pivot pins 17 and 18 are at the same height as the axes of the rigidly supported rolls 11 and 12 with respect to the scale 15. While the rolls 11 and 12 are disposed immediately adjacent the scale 15, the rolls 13 and 14 point toward a lever 16 which makes the indicator tape 10 move.

The lever 16 is a part of a lever linkage which is not shown in the figure and which transmits the movement of a measuring element, also not shown in FIG. 1. The movement is in the form of a swinging motion to the indicator tape 10.

If the lever 16 is in one of its two end positions at the right or left of FIG. 1, the rolls 11 to 14 guide the indicator tape 10 as a tensioned belt in a strictly rectangular track, a portion of which extends along the dotted line 21. If, however, the lever 16 moves in the direction toward its center position, and if all of the rolls 11 to 14 were supported rigidly, then the indicator tape 10 would have to be stretched because of the circular path of the tip of the lever. In that case, however, a mark on the indicator tape 10 would not move uniformly linearly behind the scale 15, even though the lever 16 moved with constant angular velocity. The difference between the rectilinear control of the part of the indictor tape 10 facing the scale 15 and the circular path of the part of the indicator tape 10 facing the lever 16, on the one hand, and the stretching of the indicator tape, on the other hand, which in most cases is also nonuniform, would lead to an undesirable deviation from the linearity of the indication.

As already mentioned, the indicator tape 10, is, however, inelastic in its longitudinal direction and the rolls 13 and 14 are supported resiliently. In the embodiment example, this is achieved by bracing the two rolls 13 and 14 by means of spiral springs 19 and 20, respectively, at their pivot pins 17 and 18. Another possible construction for resiliently holding the two rolls 13 and 14 is to provide that tension springs which are used to keep the indicator tape constantly taut, engage the pivot pins 17 and 18 of the two rolls above and below the rolls. The advantage of this last-mentioned embodiment is that the two rolls 13 and 14 are symmetrically rotatable about the axes of rotation of the pivot pins 17 and 18 in the deflected condition as well.

The movement of the indicator tape 10 of the indicating device according to the invention thus corresponds only to the movement of the projection of the tip of the lever 16 onto the straight path of the indicator tape indicated by the dotted line 21, while the deflection out of the main direction of the tape motion caused by the lever 16 is taken up by the spiral springs 19 and 20.

The indicating device according to the invention is eminently suitable for installation in pressure measuring instruments, remote-indication thermometers and all electrical instruments, in which a flat scale is important. The indicating device according to the invention finds a particularly advantageous application, however, in a pressure measuring instrument (manometer) such as is shown in FIG. 2, for example. Like or similarly-acting parts in FIG. 2 are provided here with the same reference symbols as in the first embodiment example of FIG. 1.

Two pressure bellows 30 and 31 are fastened to a fixed or stable pressure member or plate 32 at one end face thereof. A pressure medium is fed to the pressure bellows from the pressure member 32 through a pressure nipple 33. The free end faces of the two pressure bellows 30 and 31 are rigidly connected to each other by a bridge 34. Since the vertical axial movement of these free pressure bellows is never exactly axial when pressure is admitted, the pressure bellows 30 and 31 are mounted in the assembly on the pressure member 32 in such a way that the deviations of the movements from the respective bellows axes are in opposing direction, i.e., the bridge 34 moves strictly parallel to the axis of the bellows.

Engaging the center of the bridge 34 is a lever linkage 35 which is constructed as an eccentric and has the lever 16 extending therefrom in the direction toward the indicator tape 10. The transformation of the linear motion of the bridge 34 into a swinging movement of the lever 16 by the linkage 35 therefore has no play at all, since gears, racks and worm gears are avoided.

The movement of the indicator tape 10 due to the swinging motion of the lever 16 has already been described in detail in connection with FIG. 1. The lever 16 can be adjusted in a particularly simple manner if the lever linkage 35 is provided with a lockable sliding sleeve, by means of which the length of the linkage can be varied at will.

The indicating device according to the invention also makes it possble to provide two parallel indicating tapes 10 which have a conventional metallization for activating proximity indicators 36. For safety switching, one of the two indicator tapes 10 is metallized from the zero point down and the other tape from the zero point up. Thus, all control problems which can be expected of a manometer, can be handled therewith. The proximity indicators 36 can be moved about on the scale 15 to any desired position.

Besides proximity indicators 36 which operate without making contact, other pointer markings such as mechanical setpoint switches, for instance in the form of microswitches 39, can also be provided. The adjustment knobs 40 of these microswitches 39 can likewise be moved on the scale 15 to any desired position and are firmly connected to a string which is led parallel to the indicator tapes 10 around the axes of the rolls 11 to 14 and is tensionally connected to a setpoint lever 37 on the side facing the measuring mechanism and away from the scale 15. Like the lever 16, the setpoint levers 37 are connected to the lever linkage 35 and thus execute the same swinging motion as the lever 16 if the bridge 34 is deflected by the pressure bellows 30 and 31.

The lever 16 carries a control surface 38 for each setpoint lever 37, through which the end switches installed on the setpoint levers 37 can be actuated. Thus, the setpoint and switching system also contains no parts of any kind which have critical motion play. The system therefore works with the same accuracy as the actual-value system, especially since for this system, automatic compensation between the circular movement of the setpoint levers 37 and the linear divisions of the plane scale 15 is also provided by the way in which the string is led over the resiliently supported rolls 13 and 14. It is a special advantage that the pressure measuring device according to FIG. 2 can be modified at any time for other measurement purposes and other measuring ranges without great technical effort. To this end it is only necessary to exchange the pressure bellows 30 and 31 and/or the scale 15. It is thereby possible to measure, with one and the same device, overpressures, underpressures and differential pressures with any desired pressure ranges. In addition, the manometer equipped with the indicating device according to the invention has small and, in particular, extremely narrow dimensions and is therefore eminently suitable for installation in 19-inch frames.

The scale 15 is advantageously engraved on a transparent cover plate which may be made of glass or plastic. Customarily, they are linearly subdivided in manometers for a pressure range of 0.2 to 1 bar. The divisions can also follow, however, another mathematical or physical law, depending on the control problem to be solved, and may, for instance, have sine waveform.

The above-described construction of the indicating device according to the invention has the advantage that the scale can be replaced without interruption of the operation of the measuring and control apparatus and without moving the setpoint contacts, i.e., the indicators. This is done by removing the cover plate and replacing it with another having a different scale.

The lengthening of the tape path is made possible in both cases by the resilient mounting of the two further rolls 13 and 14. As mentioned hereinbefore, it can also be obtained by the elasticity of the indicator tape. However, both embodiments can also be combined, which appears to be desirable, particularly if more lengthening of the tape path becomes necessary.

The use of the indicating device is, of course, not limited to a pressure measuring device or manometer. The measuring element or means for rotating the lever 16 to produce an arcuate movement of the connection point between the lever 16 and the tape 10, which are pressure bellows 30, 31 in the above-described embodiment, could be replaced by a suitable device for measuring any physical parameter to be indicated on a scale.

There are claimed:

1. In an indicating device for measuring and control apparatus, having a planar scale, a flexible, endless indicator tape movable along said scale, at least two rotatable rigidly supported rolls tensionally supporting said tape, a pivotally mounted lever linkage connected at a point thereon to said tape, and means for rotating said lever linkage in an arcuate movement at said connection point thereon in response to measurement of a given physical parameter, means for compensating a lengthening of said tape caused by the arcuate movement of said lever linkage and tape at said connection point.

2. Indicating device according to claim 1, wherein said tape is elastic so as to compensate for the arcuate movement of said lever and tape at said connection point.

3. Indicating device according to claim 1, wherein said compensating means are two rotatable resiliently supported rolls supporting said tape, each forming a pair with one of said rigidly supported rolls beyond an end of said scale.

4. Indicating device according to claim 3, wherein said resiliently supported rolls are mounted on stationary pivot pins, and including spiral springs bracing said resiliently supported rolls against said pivot pins.

5. Indicating device according to claim 3, wherein said resiliently supported rolls are mounted on stationary pivot pins, and including tension spring means, disposed further beyond the end of said scale than said resiliently supported rolls, for keeping said indicator tape taut.

6. Indicating device according to claim 3, 4 or 5, wherein said rigidly supported roll of each pair of rolls faces toward said scale and said resiliently supported roll of each pair of rolls faces toward said lever linkage.

7. Indicating device according to claim 6, wherein at least part of said lever linkage is formed of rubber-elastic material.

8. Indicating device according to claim 6, including a pointer marking disposed on said tape and wherein said scale is engraved in an exchangeable, transparent cover plate.

9. Indicating device according to claim 6, including an additional indicator tape disposed parallel to said first-mentioned indicator tape and a metalization coating for activating indicators disposed on one of said tapes from a given zero point to one end of said scale and on the other of said tapes from said zero point to the other end of said scale.

10. Indicating device according to claim 3, including pins supporting said pairs of rolls, at least one setpoint lever rotatably connected to said lever linkage, a switch settable to a desired setpoint value disposed on said setpoint lever, a string mounted on said pins and tensionally connected to said setpoint pointer, and a setting knob attached to said string and movable along said scale.

11. Indicating device according to claim 1, wherein said rotating means is a pressure measuring device comprising two mutually parallel pressure bellows each having one end face fastened to a fixed pressure plate and another end face fastened to a common movable bridge, said lever linkage including an eccentric engaging said bridge so as to arcuately move said connection point and linearly move said indicating tape in accordance with movement of said bellows.

* * * * *